United States Patent [19]

Glang

[11] Patent Number: 4,762,441
[45] Date of Patent: Aug. 9, 1988

[54] SEALING PROFILE

[75] Inventor: Siegfried Glang, Hamburg, Fed. Rep. of Germany

[73] Assignee: Phoenix Aktiengesellschaft, Hamburg, Fed. Rep. of Germany

[21] Appl. No.: 916,503

[22] Filed: Oct. 8, 1986

[30] Foreign Application Priority Data

Nov. 15, 1985 [DE] Fed. Rep. of Germany ....... 3540494

[51] Int. Cl.$^4$ .............................................. E21D 11/38
[52] U.S. Cl. ...................................... 405/152; 52/396; 277/205; 277/207 R; 405/135
[58] Field of Search ........................ 405/152, 150, 135; 52/396; 277/205, 207 R, 211; 404/64, 65

[56] References Cited

U.S. PATENT DOCUMENTS

| | | | |
|---|---|---|---|
| 4,043,693 | 8/1977 | Brown | 52/396 X |
| 4,195,850 | 1/1980 | Berger et al. | 405/152 X |
| 4,199,158 | 4/1980 | de Munck | 52/396 X |
| 4,351,622 | 9/1982 | Kerschner | 52/396 X |
| 4,362,428 | 12/1982 | Kerschner | 52/396 X |
| 4,616,460 | 10/1986 | Nicholas | 52/396 |

Primary Examiner—Dennis L. Taylor
Attorney, Agent, or Firm—Collard, Roe & Galgano

[57] ABSTRACT

A sealing profile made of rubber or a rubber-like material for sealing tunnel segments provided with peripherally extending recesses. The profile includes grooves extending parallel to each other on the base side in the longitudinal direction, angled lateral sides, and plane-surfaced top and base surfaces. Ducts extend in the longitudinal direction within the profile and are arranged in a plurality of rows. The ducts have an approximately equal spacing between each other both within each row and from one row to another.

7 Claims, 2 Drawing Sheets

SEALING PROFILE

BACKGROUND OF THE INVENTION

The invention relates to a sealing profile for sealing tunnel segments. More particularly it relates to a rubber or rubber-like material sealing profile for sealing tunnel segments having recesses along their peripheries.

Such sealing profiles are known according to DE-PS No. 2833 345, DE-GM (Petty Patent) No. 85 02 036, and DE-GM (Petty Patent) No. 85 21 068. These profiles have been successfully used in tunnel construction using tunnel segments or tubings made of concrete, cast iron or steel. The profile has to meet the following important requirements:

(1) A favorable distribution of forces and stresses within the profile upon compression between the segments;

(2) Reliable and secure adhesion or glueing of the profiles within the recesses of the segments;

(3) Maximized or largest possible areas of contact; and (4) Resistance to swelling, weathering, and chemicals.

The force path behavior or force and stress distribution within the profile must satisfy special requirements depending on the depth, width, and spacing of the segments in the unloaded or loaded (compressed) state, as well as on the thickness of the profiles. Until now, the profile dimensions were normally as shown below in column A:

|  | A (mm) (Conventional profile) | B (mm) (Example of alternative profile) |
| --- | --- | --- |
| Recess width (base side of profile) | 33 | 25 |
| Recess depth | 10 | 10 |
| Spacing of the segments (unloaded state) | 9 | 13 |
| Spacing of the segments (loaded state) | 0-4 | 0-10 |
| Profile height | 14.5 | 16.5 |

If other dimensions e.g., those shown in column B are required, (for example, a narrower width of the recess, larger profile height, and larger spacing of the segments in the unloaded or loaded state as compared to the dimensions shown in Column A), it might initially be assumed that such a sealing profile could simply be dimensioned accordingly, without substantially changing the profile shape, while still retaining the original performance characteristics. However, practice has shown that it is not possible to accomplish such a change in sealing profile dimensions while retaining an optimal force-path behavior or internal force and stress distribution, without also substantially changing the shape of the profile. Therefore, to successfully achieve the desired change in dimensions without compromising profile effectiveness, a change in the profile shape has previously been required.

Accordingly, it is an object of the invention to provide a sealing profile, for segments of tunnel tubes, which has a favorable force and stress distribution within the profile material, on compression of the tunnel segments, irrespective of the profile dimensions required to fit particular tunnel segment recesses, and which has about the same geometric shape as existing profiles.

SUMMARY OF THE INVENTION

The foregoing and related objects are readily attained according to the invention in a sealing profile for sealing tunnel segments assembled to form a tubular tunnel, wherein the segments include recesses extending peripherally therearound, including a base section having outwardly inclined lateral sides, a planar base surface, and a plurality of parallel grooves extending in the base section in a direction parallel to the longitudinal direction of the profile. An upper section integral with the base section has inwardly inclined lateral sides. A plurality of ducts extend parallel to the grooves, with the ducts disposed in a plurality of rows with an approximately equal spacing between the ducts within the rows and between the rows.

Preferably, the ducts are arranged in two rows forming a center row and an upper row, with the center row disposed adjacent to the grooves, and the ducts in the upper row of ducts are correspondingly aligned with the grooves. Most desirably, the center row includes four ducts, and the upper row includes three ducts, with all of said ducts being of the same diameter.

In a preferred embodiment, the profile includes three identically shaped flute-like grooves formed in the base surface of the base section. The lateral sides of the upper section may have a slightly concave surface when the profile is in the uncompressed state. Preferably, the profile is made of rubber or a rubber-like material, e.g., a rubber mixture based on polychloroprene, EPDM, and nitrile rubber. The sealing profile may comprise a four corner frame including four individual profile sections, which are joined at ther ends via injection molded frame corners.

It is particularly advantageous if the ducts are arranged in two rows, with the row of ducts disposed furthest away from the base of the profile being on the same level or in alignment with flute-like grooves formed in the base surface of the profile.

Other objects and features of the present invention will become apparent from the following detailed description considered in connection with the accompanying drawing, which discloses one embodiment of the invention. It is to be understood that the drawings are to be used for the purpose of illustration only, and not as a definition of the limits of the invention.

BRIEF DESCRIPTION OF THE DRAWING

In the drawings, wherein similar reference characters denote similar elements throughout the several views.

DESCRIPTION OF THE PREFERRED EMBODIMENT

Figure 1:
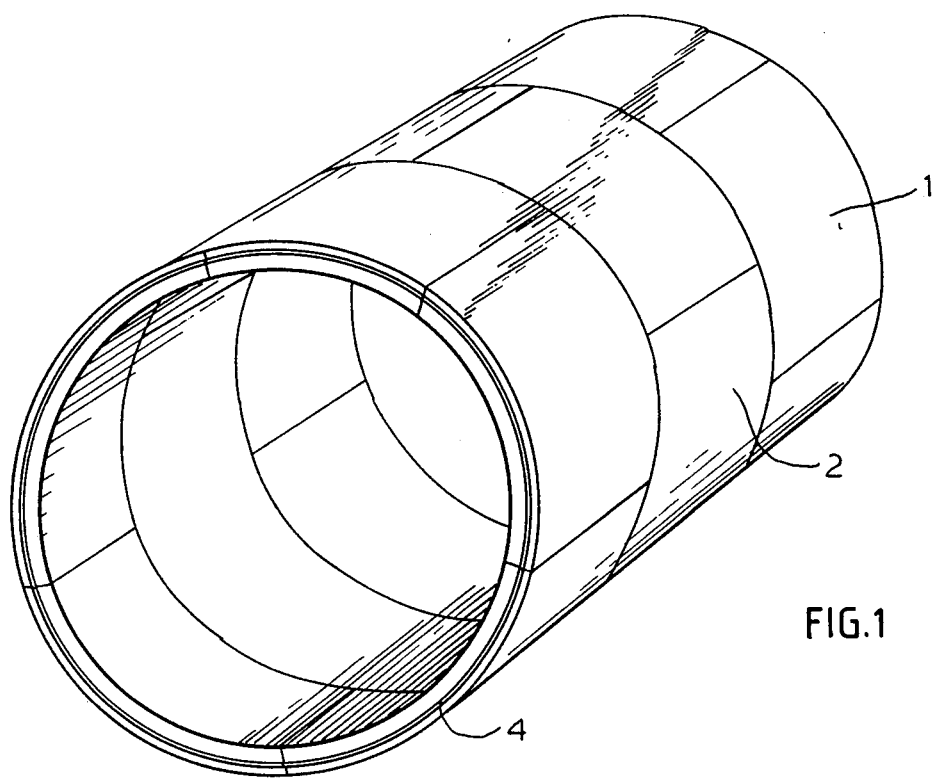
FIG. 1 is a front perspective view of a pipe section formed by a plurality of tunnel pipe segments.

Turning now in detail to the appended drawings, therein illustrated is a novel sealing profile embodying the present invention wherein, as shown in FIG. 1, a plurality of tunnel segments, e.g., 1 and 2, are sealed against one another, via abutting sealing profiles, thereby forming a sealed tunnel or pipe section.

Figure 2:
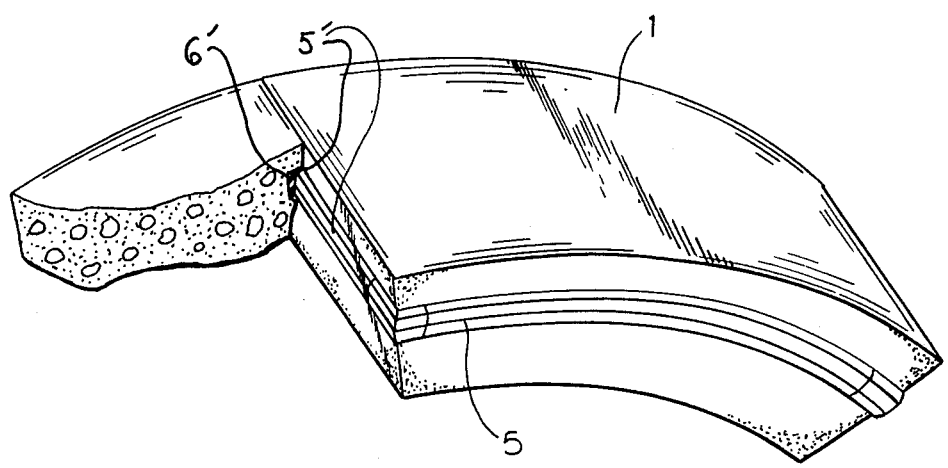
FIG. 2 is a fragmentarily-illustrated front perspective view of two assembled adjoining tunnel pipe segments with the sealing profiles of the invention mounted between each segment.

FIG. 2 further illustrates a sealing profile 5, in the uncompressed state, mounted into a recess of a tunnel segment 1. FIG. 2 also shows the engagement of two assembled tunnel segments, 1 and 2, and the resulting compression of the respective profiles 5 and 6 into compressed profiles 5' and 6'.

Figure 3:
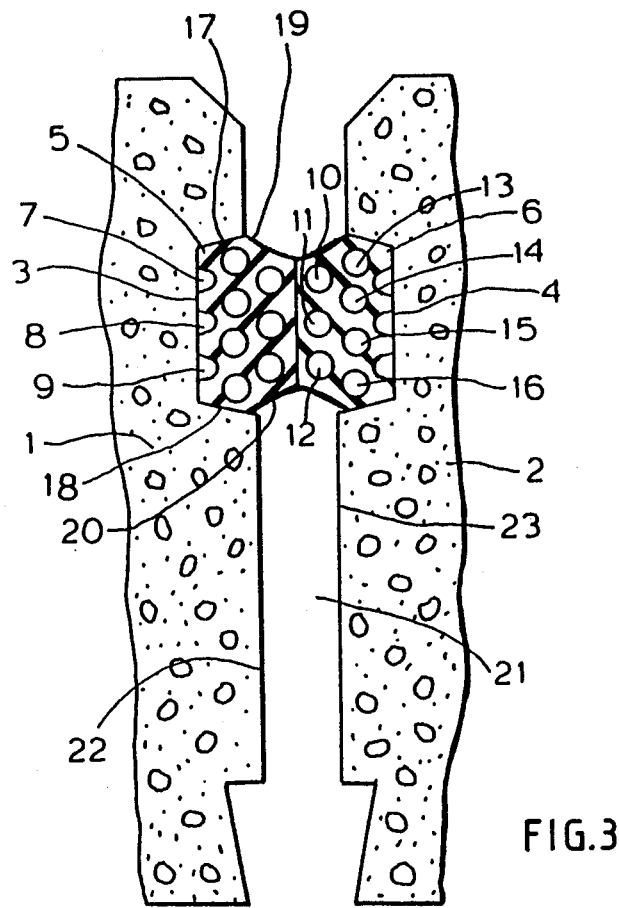
FIG. 3 is a cross-sectional view of two tunnel segments with the sealing profiles of the invention arranged in the tunnel segment recesses, in the state prior to compression.

The structure of the profile of the invention is best illustrated in cross section in FIG. 3, wherein each of the two tunnel segments 1 and 2 has a recess 3 and 4, respectively. Two sealing profiles 5 and 6 are adhered, as by gluing, into the recesses back to back. Each sealing profile has three grooves 7, 8 and 9 on the base side. These grooves may be flute-like or curved and are equally spaced apart. Furthermore, the profile has seven ducts 10–16 arranged in two rows, at least partially laterally offset. Grooves 7–9 and ducts 10–16 have an approximately equal spacing between each other. In this way, the wall thickness between each of these spaces or the minimum separation therebetween is everywhere substantially uniform. The lateral sides 17 and 18 have an angle of 15° with respect to a plane perpendicular to the base surface. In the unloaded or uncompressed state, the surface of each lateral side 19 and 20 has a slightly concave shape. The width of the plane-faced back or base surface of the profile is approximately 70 to 80% of the maximum profile width.

As the two profiles 5 and 6 are compressed within zone 21 when segments 1 and 2 are mechanically joined together, the rubber mass of each profile is displaced into recesses 3 and 4. In the final assembled state, the spacing between edges 22 and 23 of segments 1 and 2 is in the range of from 0 to 10 mm depending on construction tolerances.

Figure 4:
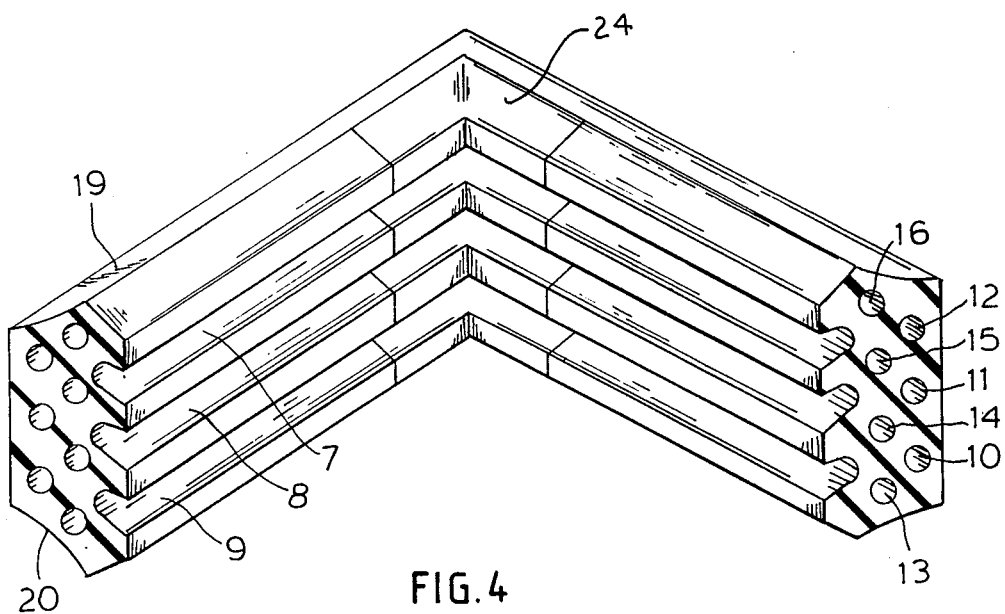
FIG. 4 is a fragmentarily-illustrated front perspective view of a preferred embodiment of a sealing profile corner section.

As illustrated in FIGS. 2 and 4, the sealing profile may be comprised by four individual profile pieces which are joined at the corners to form a profile frame dimensioned to match the peripheral recess in the tunnel segments. The frame corners 24 joining each of the individual profile pieces may be manufactured by the injection molding process.

Thus, while only a single embodiment of the present invention has been shown and described, it is obvious that many changes and modifications may be made thereunto, without departing from the spirit and scope of the invention.

What is claimed is:

1. A sealing profile formed of rubber or rubber-like material for sealing tunnel segments assembled to form a tubular tunnel, the segments each having a recess extending peripherally therearound, said sealing profile having a substantially cross-sectional shape in the form of two isosoles trapezoids joined along a common long base leg and defining a base side with two outwardly inclined first lateral sides and a back side parallel to the base side with two inwardly inclined second lateral sides, said base side including three longitudinally extending parallel fluted grooves, a first row of three longitudinally extending parallel ducts disposed proximate said back side and a second row of four longitudinally extending parallel ducts disposed parallel to said first row of ducts between said first row of ducts and said fluted grooves, the ducts in said first row each being in alignment with a respective fluted groove, and the ducts in said second row being laterally offset therefrom and the ducts in said first and second rows being of equal diameter and having substantially equal spacing between the ducts in each row and the ducts from row to row.

2. The sealing profile according to claim 1, wherein said lateral sides extending from said back side having a slightly concave surface when the profile is in the uncompressed state.

3. The sealing profile according to claim 1, wherein said rubber has a Shore A-hardness of 35 to 80.

4. The sealing profile according to claim 1, wherein said sealing profile comprises a four corner frame including four individual profile sections, which are joined at their ends via injection molded frame corners.

5. The sealing profile according to claim 1, wherein said profile material comprises a rubber mixture based on polychloroprene.

6. The sealing profile according to claim 1, wherein said profile material comprises a rubber mixture based on EPDM.

7. The sealing profile according to claim 1, wherein said profile material comprises a rubber mixture based on nitrile rubber.

* * * * *